(12) United States Patent
Bernardele

(10) Patent No.: US 10,196,109 B2
(45) Date of Patent: Feb. 5, 2019

(54) BICYCLE GEARSHIFT

(71) Applicant: CAMPAGNOLO S.r.l., Vicenza (IT)

(72) Inventor: Davide Bernardele, Caldogno (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 15/815,840

(22) Filed: Nov. 17, 2017

(65) Prior Publication Data

US 2018/0148129 A1    May 31, 2018

(30) Foreign Application Priority Data

Nov. 30, 2016   (IT) .................. 102016000121398

(51) Int. Cl.
| | |
|---|---|
| *B62M 9/126* | (2010.01) |
| *B62M 9/1244* | (2010.01) |
| *B62M 9/1248* | (2010.01) |

(52) U.S. Cl.
CPC .......... *B62M 9/1244* (2013.01); *B62M 9/126* (2013.01); *B62M 9/1248* (2013.01)

(58) Field of Classification Search
CPC ... B62M 9/1244; B62M 9/1248; B62M 9/126
See application file for complete search history.

(56) References Cited

U.S. PATENT DOCUMENTS

| | | | |
|---|---|---|---|
| 4,406,643 A | * | 9/1983 | Shimano ................ B62M 9/126 474/80 |
| 8,870,692 B2 | | 10/2014 | Yamaguchi et al. |
| 8,870,693 B2 | | 10/2014 | Shahana et al. |
| 8,900,078 B2 | | 12/2014 | Yamaguchi et al. |
| 9,187,149 B2 | | 11/2015 | Yamaguchi |

(Continued)

FOREIGN PATENT DOCUMENTS

DE         202014106072 U1      2/2015

OTHER PUBLICATIONS

Italian Search Report and Written Opinion in Italian Application No. 102016000121398, dated Jul. 18, 2017, with English translation.

*Primary Examiner* — Michael R Mansen
*Assistant Examiner* — Robert T Reese
(74) *Attorney, Agent, or Firm* — Volpe and Koenig, P.C.

(57) ABSTRACT

A bicycle gearshift comprising first and second moveable bodies, a rocker arm rotatably connected to the second body on a rotation axis, an elastic element that rotates the rocker arm about the rotation axis, and a unidirectional damping device operatively arranged between the rocker arm and the second body. The unidirectional damping device comprises a first ring nut arranged coaxially to the rotation axis and rotatable with the rocker arm and a second coaxially arranged positioned axially adjacent to the first ring nut. The first and second ring nuts have matching saw-toothings. An actuator for the unidirectional damping device acts on one of said ring nuts to axially push that ring nut towards the other ring nut so as to mutually engage the saw-toothings when the rocker arm is moved about the rotation axis in a second direction of rotation. A first friction surface is associated with the second ring nut and a second friction surface is associated with the second body and is configured to slide on the first friction surface when the rocker arm is moved around the rotation axis the second direction of rotation.

10 Claims, 5 Drawing Sheets

(56) References Cited

U.S. PATENT DOCUMENTS

| | | |
|---|---|---|
| 2009/0054183 A1 | 2/2009 | Takachi et al. |
| 2012/0083371 A1 | 4/2012 | Yamaguchi et al. |
| 2012/0083372 A1 | 4/2012 | Yamaguchi et al. |
| 2013/0203532 A1 | 8/2013 | Jordan |
| 2013/0288834 A1 | 10/2013 | Yamaguchi |
| 2013/0310204 A1 | 11/2013 | Shahana et al. |
| 2014/0371013 A1 | 12/2014 | Yamaguchi |
| 2016/0176478 A1* | 6/2016 | Chang ............... B62M 9/121 |
| | | 474/69 |
| 2016/0304160 A9 | 10/2016 | Chang |
| 2016/0304162 A1* | 10/2016 | Takachi ............. B62M 9/121 |

\* cited by examiner

BICYCLE GEARSHIFT

CROSS REFERENCE TO RELATED APPLICATION(S)

This application claims the benefit of Italian Application No. 102016000121398, filed on Nov. 30, 2016, which is incorporated herein by reference as if fully set forth.

FIELD OF INVENTION

The present invention relates to a bicycle gearshift, preferably to a gearshift for a racing bicycle.

BACKGROUND

In this description, the gearshift being referred to in particular is the rear one. Such a gearshift moves the chain between the different sprockets of the sprocket assembly associated with the rear wheel of the bicycle.

In addition to the function of moving the chain correctly, the rear gearshift performs the function of keeping the chain under tension correctly when it is engaged by any of the different sprockets and during the gearshifting steps, so as to prevent the chain from dropping.

The rear gearshift typically comprises a first body associated with the bicycle frame and a second body that supports a rocker arm. The latter comprises an inner plate, an outer plate and a pair of toothed wheels arranged between the inner and outer plates and configured to engage the chain.

In the rest of the description, the terms "inner plate" and "outer plate", respectively, are used to indicate the plate of the rocker arm that, when the rocker arm is mounted on the bicycle, faces the wheel of the bicycle and to the plate of the rocker arm that, in the aforementioned mounted condition, is arranged on the opposite side with respect to the wheel of the bicycle.

The second body is connected to the first body through a pair of articulating connecting rods so as to form an articulated quadrilateral actuation linkage. Such a linkage is actuated mechanically by a sheathed cable or electrically by an electric motor.

Following the actuation of the aforementioned linkage the second body is moved with respect to the first body so as to position the rocker arm at the sprocket preselected by the cyclist and engage the chain on such a sprocket.

The rocker arm is rotatably connected to the second body at a predetermined rotation axis.

In the rest of the description and in the subsequent claims, the terms "axial" or "axially" are used to indicate a direction coinciding with or parallel to the aforementioned rotation axis, whereas the terms "circumferential" or "circumferentially" are used to indicate a direction that rotates around the aforementioned rotation axis.

An elastic element, typically a torsion spring, pushes the rocker arm in rotation about such a rotation axis in a direction of rotation that will be indicated hereinafter as "chain tensioning direction". Viewing the outer plate of the rocker arm mounted on the bicycle frontally, the chain tensioning direction corresponds to a clockwise direction of rotation of the rocker arm about the aforementioned rotation axis.

During gearshifting and/or during travel, especially on an irregular road surface, the rocker arm is subjected to oscillations about the aforementioned rotation axis. During such oscillations, the rocker arm moves in the direction of rotation opposite to the chain tensioning direction, causing a momentary detensioning of the chain and a consequent risk of chain dropping.

In order to dampen the oscillations of the rocker arm it is known to provide a unidirectional damping device between the rocker arm and the second body. Such a device is configured so as to apply a friction force on the rocker arm when the rocker arm is moved about the rotation axis in the direction of rotation opposite to the chain tensioning direction, and on the other hand to allow the rocker arm to rotate freely in the chain tensioning direction.

Examples of unidirectional damping devices are disclosed in documents US 2013/0203532, US 2012/0083371, US 2013/0310204, US 2016/0176478, US 2013/0288834, US 2014/0371013 and US2009/0054183.

These unidirectional damping devices comprise an unidirectional roller bearing arranged coaxially to the rotation axis of the rocker arm.

The Applicant has observed that the roller bearings used in the unidirectional damping devices described in the aforementioned prior art documents are very bulky. The Applicant has also observed that, in order to avoid a risk of deformation of the housing tracks of the rollers, the maximum torque transmissible through the roller bearings is very limited.

The problem at the basis of the present invention is to make a bicycle gearshift that comprises an unidirectional damping device that is more compact and efficient with respect to those described with reference to the prior art.

SUMMARY

The present invention therefore relates to a bicycle gearshift, comprising:

a first body configured to be associated with a bicycle frame;

a second body connected to, and movable with respect to, said first body;

a rocker arm rotatably connected to said second body at a predetermined rotation axis;

an elastic element configured to push said rocker arm in rotation about said rotation axis in a first direction of rotation; and an unidirectional damping device operatively arranged between said rocker arm and said second body and configured to apply a friction force to said rocker arm when said rocker arm is moved about said rotation axis in a second direction of rotation opposite to said first direction of rotation;

characterized in that said unidirectional damping device comprises:

a first ring nut arranged coaxially to said rotation axis and rotatable as a unit with said rocker arm about said rotation axis, said first ring nut comprising a first front saw-toothing;

a second ring nut arranged coaxially to said rotation axis in a position axially adjacent to said first ring nut, said second ring nut comprising a second front saw-toothing matching said first front toothing;

an actuation system configured to actuate the unidirectional damping device, said actuation system acting on at least one ring nut of said first ring nut and second ring nut to axially push said at least one ring nut towards the other ring nut of said first ring nut and second ring nut so as to mutually engage said first front toothing and said second front toothing when said rocker arm is moved about the rotation axis in said second direction of rotation;

at least one first friction surface being part of, or associated with, said second ring nut;

at least one second friction surface being part of, or associated with, said second body and configured to slide on said at least one first friction surface when said rocker arm is moved about the rotation axis in said second direction of rotation.

Throughout the present description and in the subsequent claims, the term "front toothing" is used to indicate a toothing formed on a face substantially perpendicular to the rotation axis of the rocker arm.

Throughout the present description and in the subsequent claims, the term "saw-toothing" is used to indicate a toothing wherein each tooth has a first side (hereinafter also indicated as "straight side") laying on a plane on which the aforementioned rotation axis (hereinafter also indicated as "radial plane") also lays, or on a plane substantially parallel to the aforementioned rotation axis (hereinafter also indicated as "parallel plane"), and a second side (hereinafter also indicated as "inclined side") laying on a plane inclined with respect to the aforementioned radial plane or to the aforementioned parallel plane.

Advantageously, the provision of a pair of ring nuts each having a respective front saw-toothing makes the unidirectional damping device of the invention constructively more compact than those described with reference to the prior art, the torque transmitted being equal.

Furthermore, the Applicant has observed that the pair of ring nuts used in the unidirectional damping device of the gearshift of the invention makes it possible to increase the maximum torque transmitted by up to five times with respect to that of the unidirectional roller bearings used in the described prior art. The aforementioned unidirectional damping device of the invention is therefore more efficient and reliable than those previously known. Given the high value of the maximum transmissible torque, the pair of ring nuts can be made of light alloy, like for example aluminum or alloys thereof, or in a plastic material.

In the unidirectional damping device of the invention described above, the unidirectionality is achieved thanks to the provision of the front saw-toothings and to the possibility of reciprocal movement of the two ring nuts in the axial direction when the rocker arm is moved about the rotation axis in the chain tensioning direction. In particular, the front saw-toothings are configured to define a condition of mutual engagement in rotation when the rocker arm is moved about the rotation axis in the direction of rotation opposite to the chain tensioning direction and a condition of mutual disengagement in rotation when the rocker arm rotates about the rotation axis in the chain tensioning direction. In the condition of mutual engagement in rotation, the torque imparted to a ring nut produces a circumferential thrust component on the respective front toothing that results in the transfer of torque to the other ring nut; in such a condition the unidirectional damping device is active. In the condition of mutual disengagement in rotation, the torque imparted to a ring nut produces an axial thrust component on the respective front toothing that results in an axial movement apart of the two ring nuts; in such a condition there is no transfer of torque between the two ring nuts and the unidirectional damping device is thus momentarily deactivated.

The condition of mutual engagement in rotation is defined when the torque exerted on a ring nut is oriented in such a way that the respective front toothing circumferentially pushes the front toothing of the other ring nut at the straight sides of the respective teeth. The condition of mutual disengagement in rotation, on the other hand, is defined when the torque exerted on a ring nut is oriented so that the respective front toothing circumferentially pushes the front toothing of the other ring nut at the inclined sides of the respective teeth.

BRIEF DESCRIPTION OF THE DRAWING(S)

Further features and advantages of the present invention will become clearer from the following detailed description of preferred embodiments thereof, made with reference to the attached drawings and given for indicating and not limiting purposes. In such drawings.

DETAILED DESCRIPTION OF THE PREFERRED EMBODIMENTS

Figure 1:
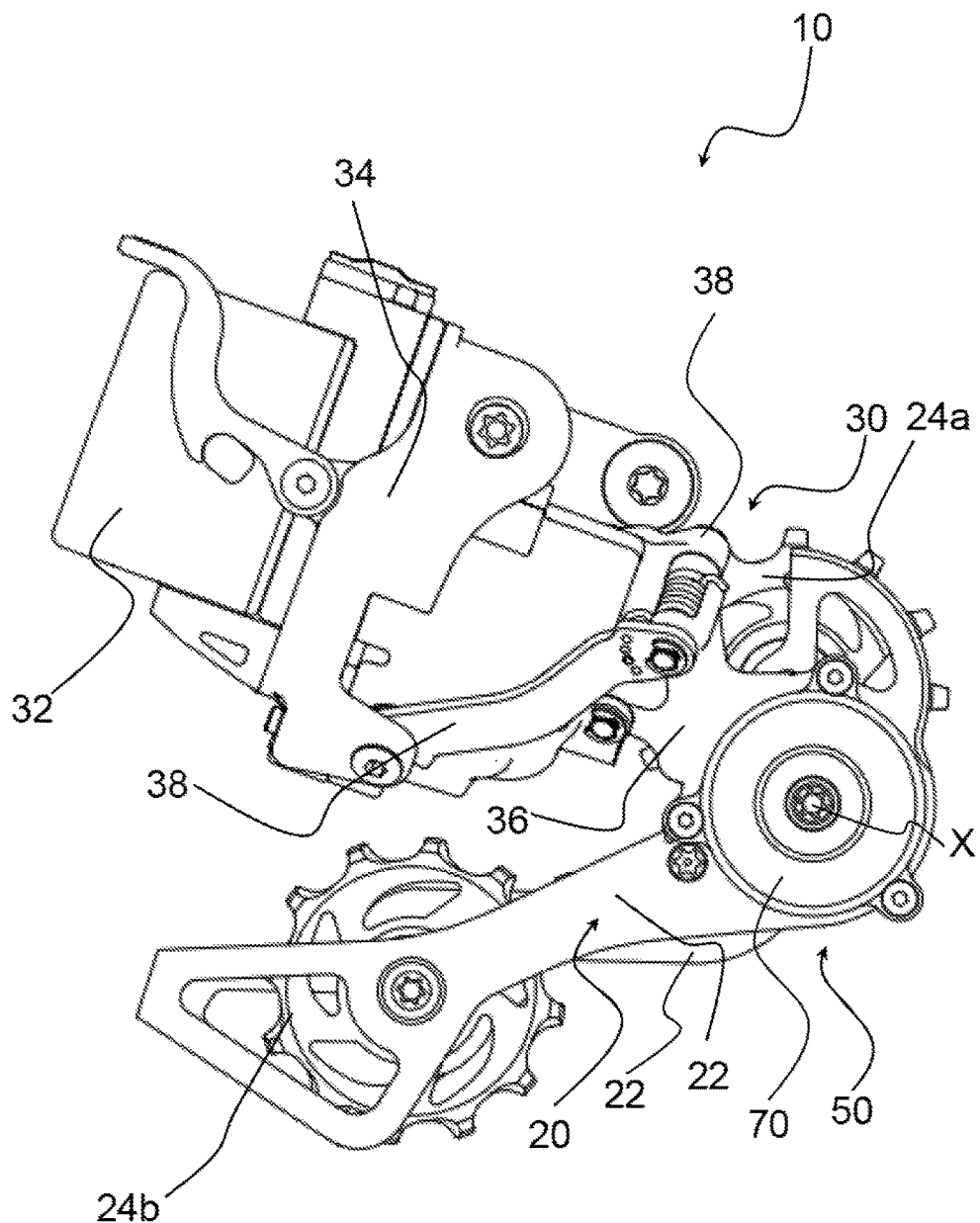
FIG. 1 is a perspective view of a first preferred embodiment of a bicycle gearshift in accordance with the present invention.

Preferred features of the bicycle gearshift according to the present invention are described below. Such preferred features can be provided individually or in combination with each other.

In a first preferred embodiment of the invention, said actuation system comprises a spring.

Preferably, said spring is operatively arranged, in a condition of at least partial compression, between said first ring nut and said second body. Such a spring pushes the first ring nut against the second ring nut, taking the respective front toothings into mutual engagement.

In a second preferred embodiment of the invention, which is alternative to the previous one, said actuation system comprises at least one magnetic element associated with a ring nut of said first ring nut and second ring nut, the other ring nut of said first ring nut and second ring nut being at least partially made of a ferromagnetic material, wherein said at least one magnetic element is arranged on said ring nut with its polarity oriented so that an attraction force acts between said ring nut and the other ring nut.

In a third preferred embodiment of the invention, which is alternative to the previous ones, said first ring nut is axially adjacent to said second body and said actuation system comprises at least one magnetic element associated with said first ring nut, the second body being at least partially made of a ferromagnetic material, wherein said at least one magnetic element is arranged on said first ring nut with its polarity oriented so that a repulsion force acts between said first ring nut and said second body.

Advantageously, in the aforementioned second and third preferred embodiment of the invention, the use of the magnetic elements allows a reduction of the axial bulk of the unidirectional damping device, with respect to the first preferred embodiment of the invention. Furthermore, the use of magnetic elements instead of the spring makes the unidirectional damping device even more reliable (since it eliminates the possibility of yielding of the spring) and even more efficient (since there is no sliding between the first ring nut and the second body of the gearshift).

Preferably, said at least one first friction surface extends in a first plane substantially perpendicular to the rotation axis.

More preferably, said at least one first friction surface is formed on a first annular element associated with a radially outer surface of said second ring nut.

Preferably, the first annular element is removably associated with, for example screwed to, the radially outer surface of the second ring nut. The first annular element can in this case be easily replaced when it is worn.

Preferably, said at least one second friction surface extends in a second plane substantially parallel to said first plane.

More preferably, said at least one second friction surface is formed on a second annular element associated with said second body.

Preferably, said first ring nut rotates as a unit with a shaft extending coaxially to said rotation axis and associated with said rocker arm.

More preferably, said first ring nut is axially moveable on said shaft away from said second ring nut, when said rocker arm is moved about the rotation axis in said first direction of rotation, so as to disengage said first front toothing from said second front toothing.

Preferably, said elastic element comprises a coil spring housed in a seat formed in said second body.

Advantageously, the housing of the coil spring in the second body makes it possible to reduce the axial bulk of the gearshift.

Preferably, said unidirectional damping device comprises a cover removably associated with said second body and an elastic abutment element operatively arranged between said cover and said second ring nut. In this way, an axial preload is defined in the unidirectional damping device that in turn defines the minimum axial load to be reached to pass correctly between the condition of mutual engagement in rotation and the condition of mutual disengagement in rotation of the two ring nuts.

Figure 2:
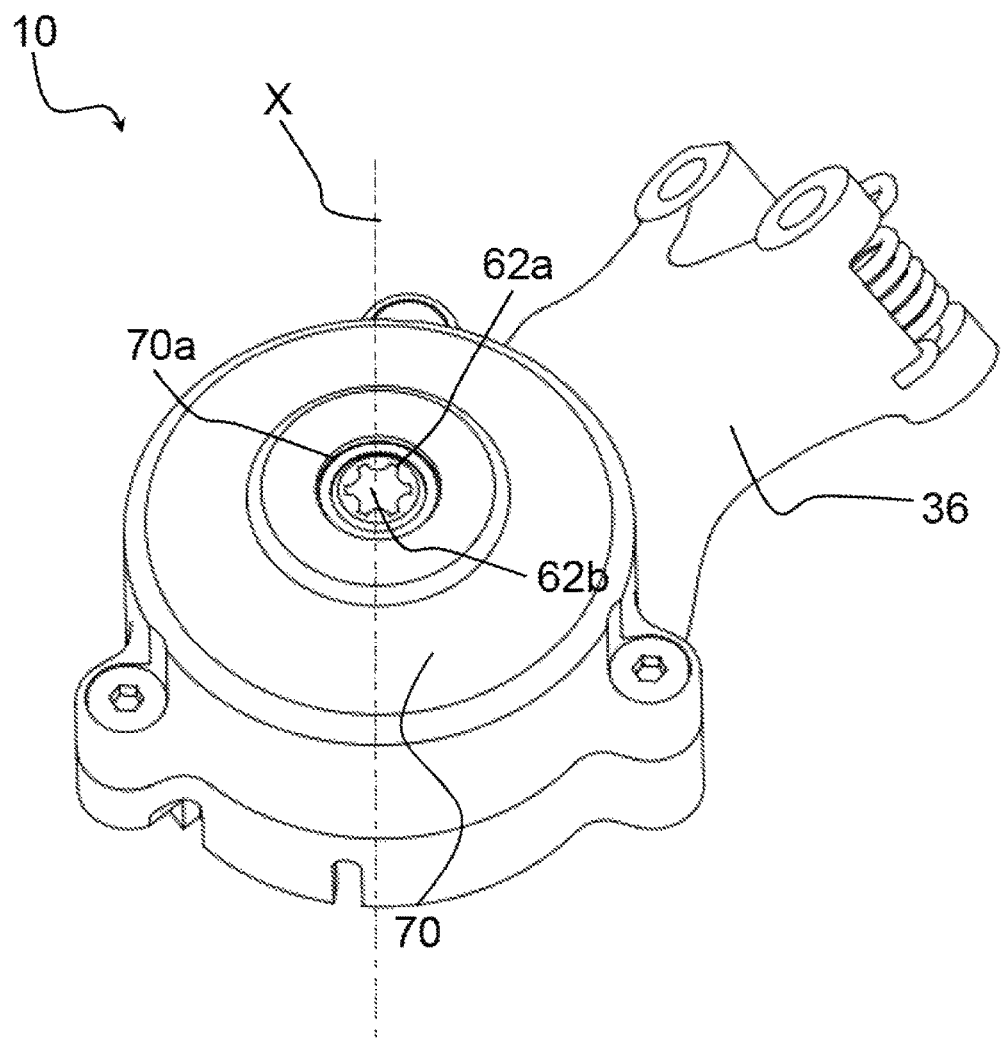
FIG. 2 is a perspective view of a portion of the bicycle gearshift of FIG. 1.
Figures 3, 3A:
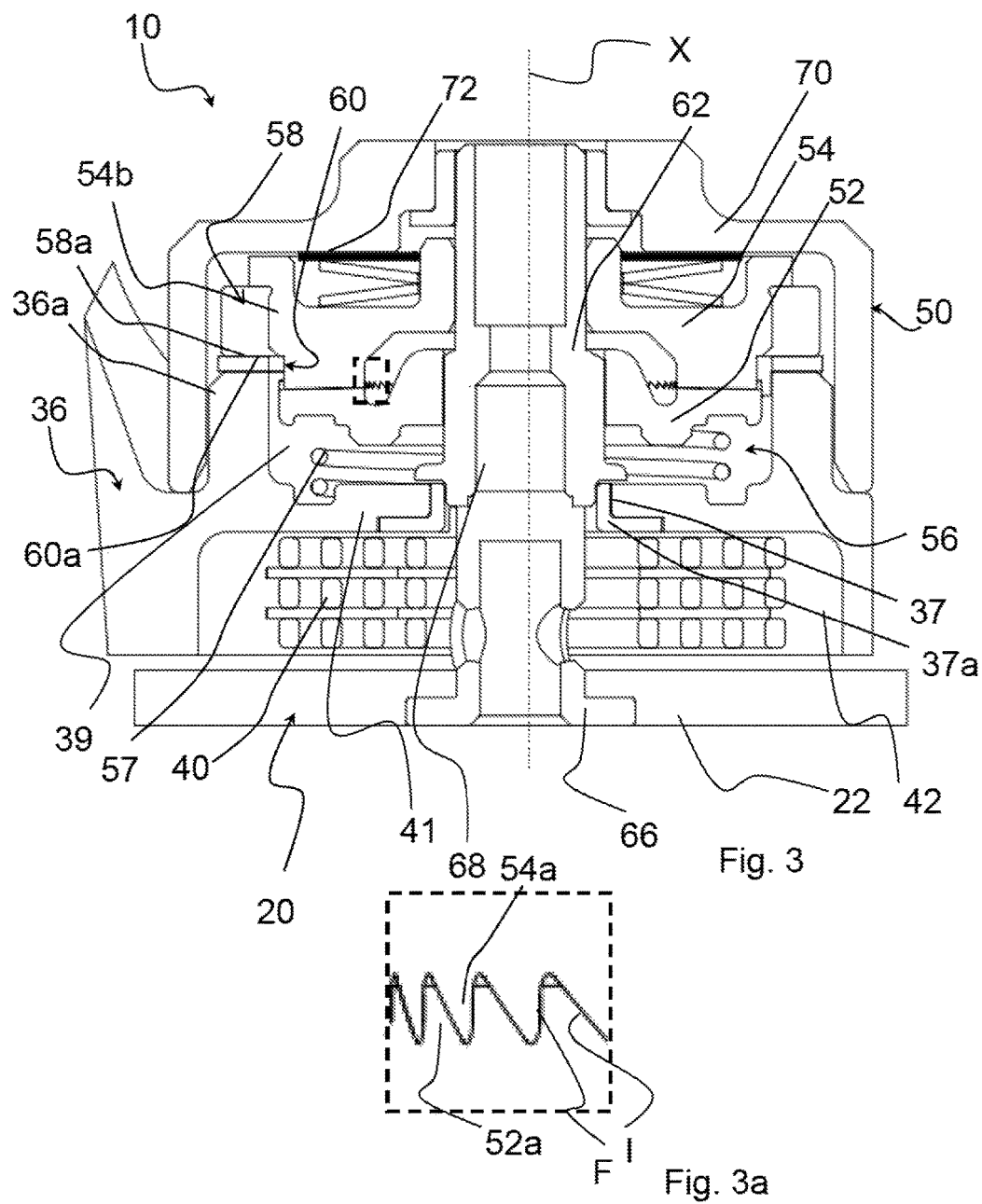
FIG. 3 is a longitudinal section view of the portion of the bicycle gearshift of FIG. 2.
FIG. 3a is an enlarged view of a detail of FIG. 3, such a detail being framed with a broken line in FIG. 3.

In FIGS. 1-3, reference numeral 10 indicates a bicycle gearshift, particularly a rear gearshift, according to a first preferred embodiment of the present invention.

The rear gearshift 10 is configured to be mounted on a bicycle frame (not shown) to move a chain (not shown) between different sprockets (not shown) of a sprocket assembly associated with the rear wheel of the bicycle.

The movement of the chain is carried out through movement of a rocker arm 20 (or chain guide) associated with an actuation linkage 30.

The gearshift 10 can be mechanically actuated (through a sheathed cable) or motor-actuated (through an electric motor). The attached figures show, as a non-limiting example, a motor-actuated gearshift, wherein the movement of the rocker arm 20 takes place by means of a drive member 32 suitably driven, typically electrically. Once driven, the actuation linkage 30 deforms to move the rocker arm 20.

The actuation linkage 30 of the gearshift 10 is an articulated quadrilateral linkage, preferably an articulated parallelogram linkage. It comprises a first body 34 configured to be associated with the frame of the bicycle, a second body 36 configured to support the rocker arm 20 and a pair of articulating connecting rods 38 that connect the first body 34 and the second body 36. The connecting rods 38 are also respectively called "inner connecting rod" and "outer connecting rod", with reference to their relative position with respect to the frame of the bicycle.

In the example illustrated here, the drive member 32 is housed in the first body 34 and drives the deformation of the actuation linkage 30, lengthening or shortening a diagonal of the articulated quadrilateral. In particular, a lengthening of such a diagonal is used to carry out an upward gearshifting (a gearshifting towards a sprocket of greater diameter), whereas vice-versa a shortening of the diagonal is used for a downward gearshifting (a gearshifting towards a sprocket of smaller diameter).

The second body 36 is moved with respect to the first body 34 so that the rocker arm 20 (supported by the second body 36) moves to be positioned at the sprocket preselected by the cyclist and the chain is engaged by such a sprocket.

The rocker arm 20 comprises a pair of opposite plates 22, an inner plate and an outer plate, and a pair of toothed wheels 24a, 24b arranged between the inner and outer plates 22 and configured to engage the chain. The outer plate 22 is adjacent to the second body 36.

The rocker arm 20 is rotatably connected to the second body 36 at a predetermined rotation axis X.

An elastic element 40 (which in the non-limiting example shown in FIG. 3 is a coil spring) pushes the rocker arm 20 in rotation about such a rotation axis X in a chain tensioning direction. In FIG. 1, which corresponds to a substantially front view of the outer plate 22 of the rocker arm 20 mounted on the bicycle, the chain tensioning direction corresponds to a clockwise direction of rotation of the rocker arm 20 about the aforementioned rotation axis X.

A unidirectional damping device 50 is operatively arranged between the rocker arm 20 and the second body 36. Such an unidirectional damping device 50 is configured to apply a friction force on the rocker arm 20 when the rocker arm 20 is moved about the rotation axis X in a direction of rotation opposite to the chain tensioning direction, i.e.—with reference to FIG. 1—in the counter-clockwise direction of rotation.

In particular, as shown in FIG. 3, the unidirectional damping device 50 comprises a pair of ring nuts 52 and 54, arranged coaxially to the rotation axis X.

The ring nut 52 is housed in a cavity 39 of the second body 36 and is rotatable as a unit with the rocker arm 20 about the rotation axis X. The ring nut 54 is arranged in a position axially adjacent to the ring nut 52 on the opposite side with respect to the outer plate 22 of the rocker arm 20.

Figure 4:
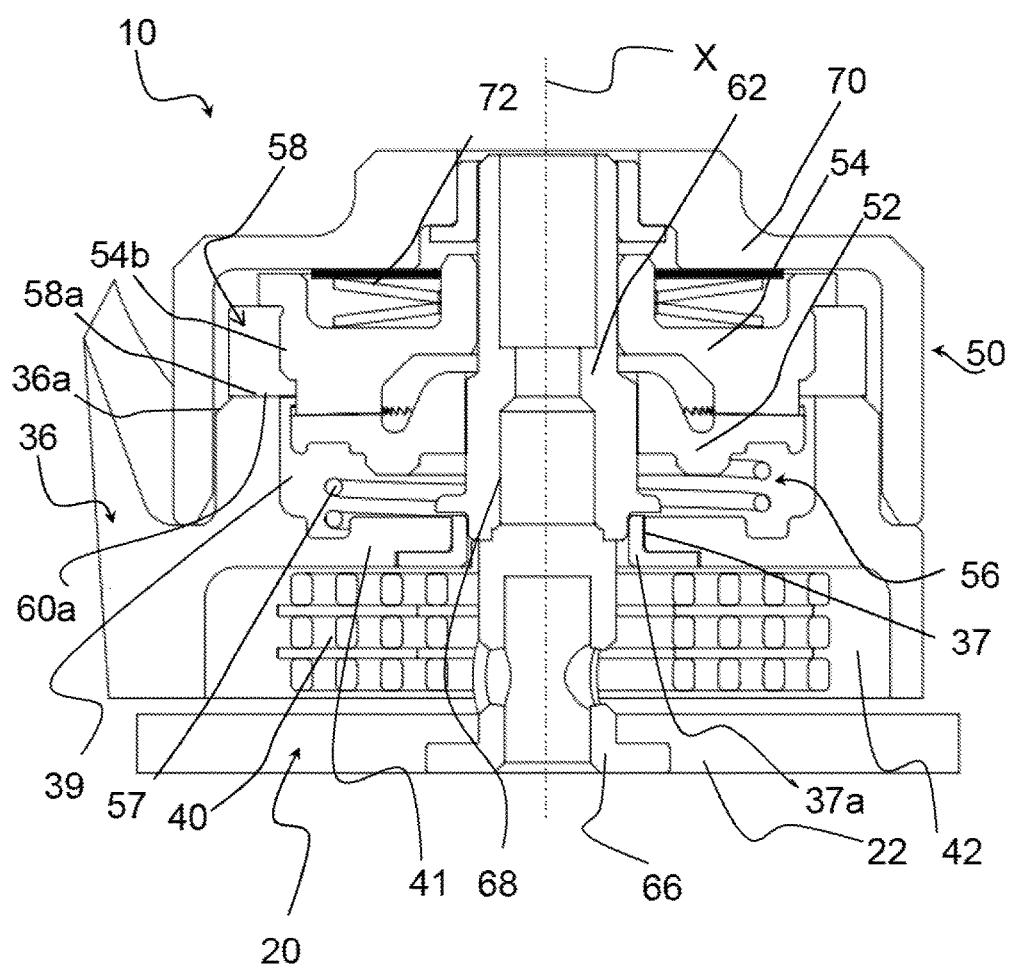
FIG. 4 is a longitudinal section view of a portion of a second preferred embodiment of a bicycle gearshift in accordance with the present invention.

As shown in FIG. 3a, the ring nut 52 comprises a first front saw-toothing 52a and the ring nut 54 comprises a second front saw-toothing 54a matching the first front toothing 52a. As also shown in FIG. 4, the saw-teeth of the first front toothing 52a, as well as the matching saw-teeth of the second front toothing 54a, each comprise a straight side F laying on a radial plane with respect to the rotation axis X and an inclined side I laying on a plane inclined with respect to the aforementioned radial plane.

The saw-teeth allow the engagement of the front toothings 52a, 54a, and therefore the transfer of torque between the ring nuts 52 and 54, in a single direction of rotation.

The ring nut 52 rotates as a unit with a shaft 62 extending coaxially to the rotation axis X and associated with the rocker arm 20.

In particular, as shown in FIG. 3, the outer plate 22 of the rocker arm 20 has a screw 66 fixed thereto that extends coaxially to the rotation axis X. The screw 66 is co-molded, glued, implanted with interference or joined in other per se conventional ways to the outer plate 22. The shaft 62 is housed in a through hole 37 of the second body 36 and is screwed onto the screw 66 through a threaded coupling 68, so that the shaft 62 is rotatable as a unit with the rocker arm 20 with respect to the second body 36. A sliding washer 37a is provided between through hole 37 and shaft 62.

A shape coupling is provided between the ring nut 52 and the shaft 62. The shape coupling allows the ring nut 52 to rotate as a unit with the shaft 62 and to be axially moveable on the shaft 62.

As shown in FIG. 3, the coil spring 40 is wound around the screw 66 and is housed in a seat 42 formed in the second body 36. In the non-limiting example shown in FIG. 3, the seat 42 faces the outer plate 22 of the rocker arm 20.

The second body 36 comprises an annular inner wall 41 axially arranged between the seat 42 and the cavity 39. The through hole 37 is formed on the annular inner wall 41.

The gearshift 10 comprises an actuation system 56 configured to actuate the unidirectional damping device 50.

With reference to FIG. 3, such an actuation system 56 acts on the ring nut 52 to push it towards the ring nut 54 so as to mutually engage the first front toothing 52a and the second front toothing 54a when the rocker arm 20 is moved about the rotation axis X in the direction of rotation opposite to the chain tensioning direction. With reference to FIG. 3a, such a direction of rotation corresponds to a movement of the front toothing 52a from right towards left. In this way a transfer of torque is obtained from the ring nut 52 to the ring nut 54 due to the circumferential thrust exerted by the straight sides F of the teeth of the front toothing 52a on the straight sides F of the teeth of the front toothing 54a.

In a variant embodiment of the invention that is not shown, the actuation system 56 could act on the ring nut 54 to push it towards the ring nut 52, with the same effects discussed above.

When the rocker arm 20 is, on the other hand, moved about the rotation axis X in the chain tensioning direction, the ring nut 52 moves axially on the shaft 62 away from the ring nut 54, so that the first front toothing 52a disengages from the second front toothing 54a, allowing each tooth of the first front toothing 52a to pass over the tooth of the second front toothing 54a circumferentially adjacent in the direction of rotation considered. With reference to FIG. 3a, such a direction of rotation corresponds to a movement of the front toothing 52a from left to right. In this case, the inclined sides I of the teeth of the front toothing 52a slide on the inclined sides I of the teeth of the front toothing 54a and there is no transfer of torque from the ring nut 52 to the ring nut 54.

In the preferred embodiment of the present invention, shown in FIG. 3, the pushing action of the ring nut 52 towards the ring nut 54 is exerted by a spring 57, in particular by a helical spring 57.

The spring 57 is operatively arranged, in a condition of at least partial compression, between the ring nut 52 and the inner annular wall 41 of the second body 36 so as to keep the ring nut 52 pushed axially against the ring nut 54.

The unidirectional damping device 50 further comprises a first friction element 58 associated with the ring nut 54 and a second friction element 60 associated with the second body 36.

The first friction element 58 has a first friction surface 58a. The second friction element 60 has a second friction surface 60a configured to slide on the first friction surface 58a when the rocker arm 20 is moved about the rotation axis X in the direction of rotation opposite to the chain tensioning direction, i.e. when the actuation system 56 is active.

The first friction surface 58a extends in a plane substantially perpendicular to the rotation axis X. The second friction surface 60a extends in a plane substantially parallel to the plane in which the first friction surface 58a extends.

In the example of FIG. 3, the first friction element 58 is screwed onto a radially outer surface 54b of the ring nut 54, whereas the second friction element 60 is associated with an annular portion 36a of the second body 36 that extends from the inner annular wall 41 of the second body 36 on the opposite side with respect to the seat 42. The annular portion 36a defines the cavity 39 inside which the ring nut 52 is housed.

The friction surfaces 58a and 60a of the first and second friction element 58 and 60 can be reinforced with a suitable coating or by an anti-wearing treatment.

The first and second friction element 58 and 60 are preferably made of metallic material.

The ring nuts 52 and 54 and the second body 36 can be made of plastic material or of light alloy, like for example aluminum or alloys thereof.

The unidirectional damping device 50 comprises a cover 70 removably associated with the second body 36. In the example of FIG. 3, the cover 70 is coupled with the annular portion 36a of the second body 36.

An elastic abutment element 72 is operatively arranged between the cover 70 and the ring nut 54 so as to counteract the axial thrust exerted by the ring nut 52 on the ring nut 54.

In the non-limiting example shown in FIG. 3, the elastic abutment element 72 comprises one or more cup springs.

The possible preload applied to the elastic abutment element 72 when the cover 70 is mounted on the second body 36 with the elastic abutment element 72 arranged between the cover 70 and the ring nut 54 defines the axial load acting between the first friction element 58 and the second friction element 60, and therefore the friction force generated by the unidirectional damping device 50 when the rocker arm 20 is moved about the rotation axis X in the direction of rotation opposite to the chain tensioning direction.

The mounting of the cover 70 on the second body 36 of the gearshift 10 can for example take place through: threaded coupling, interference coupling, snap coupling, screws, gluing or other per se conventional ways.

There is no continuous adjustment device which continuously adjust the axial position of the cover 70 once it is mounted on the second body 36. Possible calibrated thicknesses can be added above the elastic abutment element 72 or it is possible for example to limit the screwing of the cover 70 on the second body 36 by providing calibrated thicknesses at the interface between cover 70 and second body 36 so as to change the axial mounting position of the cover 70 on the second body 36.

As shown in FIG. 2, the cover 70 comprises a through opening 70a arranged at the rotation axis X. Such a through opening 70a is configured to allow access to a head end 62a of the shaft 62. On the head end 62a a shaped recess 62b is formed that is configured to couple with a tool (not shown) to be used in order to dismount the rocker arm 20. In the example of FIG. 2 the shaped recess 62b has a hexagonal star-shape and is configured to couple with a corresponding tool such as an Allen key.

During normal operation of the gearshift 10, the through opening 70a can be advantageously closed by a cap (not shown), which can be screwed, fitted by interference or hooked through a coupling with undercutting to the through opening 70a itself.

FIG. 4 shows a second preferred embodiment of a bicycle gearshift 10 according to the present invention.

The components of the bicycle gearshift 10 of FIG. 4 analogous or functionally equivalent to those of the bicycle gearshift 10 of FIGS. 1-3 are indicated with the same reference numeral and for their description reference should be made to what is described above.

The bicycle gearshift 10 of FIG. 4 differs from the bicycle gearshift 10 of FIGS. 1-3 substantially solely in that the second friction element 60 associated with the second body 36 is omitted.

In this second preferred embodiment of the present invention, the second friction surface 60a is indeed formed directly on the second body 36, in particular on the annular portion 36a of the second body 36.

In this second embodiment, the first friction element 58 and the second body 36 (or at least the annular portion 36a of the second body 36) are preferably made of metallic material.

In a variant embodiment of the invention, not shown, the first friction element 58 could be omitted and the first friction surface 58a could be formed directly on the ring nut 54, in particular on a radially outer portion of the ring nut 54.

In this variant embodiment, the ring nut 54 (or at least the radially outer portion of the ring nut 54) is preferably made of metallic material.

Figure 5:
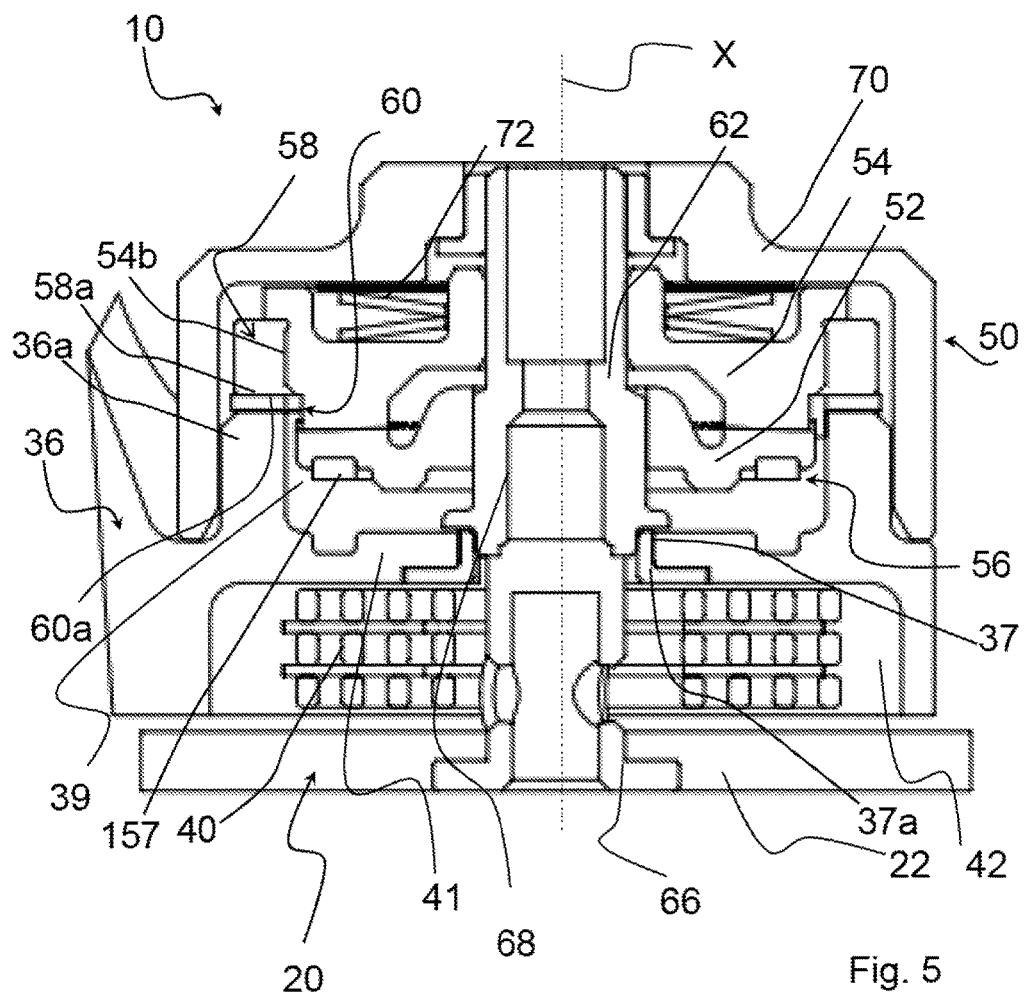
FIG. 5 is a longitudinal section view of a portion of a third preferred embodiment of a bicycle gearshift in accordance with the present invention.

FIG. 5 shows a third preferred embodiment of a bicycle gearshift 10 according to the present invention.

The components of the bicycle gearshift 10 of FIG. 5 analogous or functionally equivalent to those of the bicycle gearshift 10 of FIGS. 1-3 are indicated with the same reference numeral and for their description reference should be made to what is described above.

The bicycle gearshift 10 of FIG. 5 differs from the bicycle gearshift 10 of FIGS. 1-3 substantially solely in that the actuation system 56 comprises, instead of the spring 57, a magnetic element 157 associated with the ring nut 52. In such an embodiment, the ring nut 54 is at least partially made of a ferromagnetic material. The magnetic element 157 is arranged on the ring nut 52 with its polarity oriented so that an attraction force acts between the ring nut 52 and the ring nut 54.

Just one magnetic element 157, for example with an annular shape, or a plurality of them can be provided.

Again with reference to FIG. 5, in a variant embodiment of the invention, the magnetic element 157 is still associated with the ring nut 52 and the second body 36 is at least partially made of a ferromagnetic material. In particular, at least the inner annular wall 41 of the second body 36 is made of ferromagnetic material. In such an embodiment, the magnetic element 157 is arranged on the ring nut 52 with its polarity oriented so that a repulsion force acts between the ring nut 52 and the second body 36 and the ring nut 52 is thus pushed towards the ring nut 54.

Also in this case, just one magnetic element 157, for example with an annular shape, or a plurality of them can be provided.

It is clear that the magnetic element 157 of the embodiments described above performs the same thrusting function exerted by the spring 57 of the embodiments of FIGS. 1-4.

Of course, in order to satisfy specific and contingent requirements, those skilled in the art can make numerous modifications and changes to the bicycle gearshift described above, all of which are in any case within the scope of protection of the present invention as defined by the following claims.

What is claimed is:

1. A bicycle gearshift, comprising:
    a first body configured to be associated with a bicycle frame;
    a second body connected to, and moveable with respect to, said first body;
    a rocker arm rotatably connected to said second body at a predetermined rotation axis (X);
    an elastic element configured to push said rocker arm in rotation about said rotation axis (X) in a first direction of rotation; and
    an unidirectional damping device operatively arranged between said rocker arm and said second body and configured to apply a friction force to said rocker arm when said rocker arm is moved about said rotation axis (X) in a second direction of rotation opposite to said first direction of rotation;
    wherein said unidirectional damping device comprises:
        a first ring nut arranged coaxially to said rotation axis (X) and rotatable as a unit with said rocker arm about said rotation axis (X), said first ring nut being fixedly connected to said rocker arm and comprising a first front saw-toothing;
        a second ring nut arranged coaxially to said rotation axis (X) in a position axially adjacent to said first ring nut, said second ring nut comprising a second front saw-toothing matching said first front toothing;
        an actuation system configured to actuate the unidirectional damping device, said actuation system acting on at least one ring nut of said first ring nut and second ring nut to axially push said at least one ring nut towards the other ring nut of said first ring nut and second ring nut so as to mutually engage said first front toothing and said second front toothing when said rocker arm is moved about the rotation axis (X) in said second direction of rotation;
        at least one first friction surface being associated with said second ring nut; and,
        at least one second friction surface being associated with said second body and configured to slide on said at least one first friction surface when said rocker arm is moved about the rotation axis (X) in said second direction of rotation.

2. The gearshift according to claim 1, wherein said actuation system comprises a spring.

3. The gearshift according to claim 2, wherein said spring is operatively arranged, in a condition of at least partial compression, between said first ring nut and said second body.

4. The gearshift according to claim 1, wherein said actuation system comprises at least one magnetic element associated with a ring nut of said first ring nut and second ring nut, the other ring nut of said first ring nut and second ring nut being at least partially made of a ferromagnetic material, wherein said at least one magnetic element is arranged on said ring nut with its polarity oriented so that an attraction force acts between said ring nut and the other ring nut.

5. The gearshift according to claim 1, wherein said first ring nut is axially adjacent to said second body and wherein said actuation system comprises at least one magnetic element associated with said first ring nut, the second body being at least partially made of a ferromagnetic material, wherein said at least one magnetic element is arranged on said first ring nut with its polarity oriented so that a repulsion force acts between said first ring nut and said second body.

6. The gearshift according to claim 1, wherein said at least one first friction surface extends in a first plane substantially perpendicular to the rotation axis (X) and is formed on a first annular element associated with a radially outer surface of said second ring nut.

7. The gearshift according to claim 6, wherein said at least one second friction surface extends in a second plane substantially parallel to said first plane and is formed on a second annular element associated with said second body.

8. The gearshift according to claim 1, wherein said first ring nut rotates as a unit with a shaft extending coaxially to said rotation axis (X) and associated with said rocker arm, said first ring nut being axially moveable on said shaft away from said second ring nut, when said rocker arm is moved about the rotation axis (X) in said first direction of rotation to disengage said first front toothing from said second front toothing.

9. The gearshift according to claim 1, wherein said elastic element comprises a coil spring housed in a seat formed in said second body.

10. The gearshift according to claim 1, wherein said unidirectional damping device comprises a cover removably associated with said second body and has an elastic abutment element operatively arranged between said cover and said second ring nut.

* * * * *